(12) United States Patent
Park et al.

(10) Patent No.: US 11,334,053 B2
(45) Date of Patent: May 17, 2022

(54) FAILURE PREDICTION MODEL GENERATING APPARATUS AND METHOD THEREOF

(71) Applicant: DOOSAN HEAVY INDUSTRIES & CONSTRUCTION CO., LTD, Changwon (KR)

(72) Inventors: Jee Hun Park, Gwangmyeong (KR); Hyun Sik Kim, Gimpo (KR); Sang Gun Na, Seoul (KR); Jun Woo Yoo, Seoul (KR)

( * ) Notice: Subject to any disclaimer, the term of this patent is extended or adjusted under 35 U.S.C. 154(b) by 0 days.

(21) Appl. No.: 17/165,544

(22) Filed: Feb. 2, 2021

(65) Prior Publication Data

US 2021/0247742 A1    Aug. 12, 2021

(30) Foreign Application Priority Data

Feb. 11, 2020  (KR) .......................... 10-2020-0016461
Feb. 18, 2020  (KR) .......................... 10-2020-0019860

(51) Int. Cl.
*G05B 19/418*    (2006.01)

(52) U.S. Cl.
CPC ...... *G05B 19/4184* (2013.01); *G05B 19/4183* (2013.01); *G05B 19/41885* (2013.01)

(58) Field of Classification Search
None
See application file for complete search history.

(56) References Cited

PUBLICATIONS

Salfner et al., "Using Hidden Semi-Markov Models for Effective Online Failure Prediction", IEEE 2007 (Year: 2007).*

* cited by examiner

*Primary Examiner* — Carlos R Ortiz Rodriguez
(74) *Attorney, Agent, or Firm* — Harvest IP Law, LLP

(57) ABSTRACT

A failure prediction model generating apparatus and method thereof are provided. The failure prediction model generating apparatus includes a memory configured to store a plurality of failure prediction models derived previously; and a processor configured to predict a failure of the plant, wherein the processor is configured to collect data measured from the plant, select at least one failure prediction model from among the plurality of failure prediction models using the collected data, and predict a failure of the plant using the selected failure prediction model.

18 Claims, 9 Drawing Sheets

SELECT MODEL GROUP

FIRST MODEL GROUP    SECOND MODEL GROUP

|  | RESIDUAL WITH OUTPUT DATA |
|---|---|
| OUTPUT VALUE 1 | 10 |
| OUTPUT VALUE 2 | 8 |
| OUTPUT VALUE 3 | 2 |
| OUTPUT VALUE 4 | 3 |
| OUTPUT VALUE 5 | 6 |

FAILURE PREDICTION MODEL GENERATING APPARATUS AND METHOD THEREOF

CROSS-REFERENCE TO RELATED APPLICATIONS

This application claims priority to Korean Patent Application Nos. 10-2020-0016461, filed Feb. 11, 2020 and 10-2020-0019860, filed Feb. 18, 2020, the disclosures of which are incorporated herein by reference in their entireties.

BACKGROUND

Apparatuses and methods consistent with exemplary embodiments relate to a failure prediction model generating apparatus and method thereof, and more particularly, to a failure prediction model generating apparatus which selects an optimal failure prediction model among a plurality of failure prediction models by using data collected from a plant and generates a new failure prediction model through a result of prediction of the failure of the plant by using the selected optimal failure prediction model, and to a method thereof.

In general, large plants such as a power generation plant or a chemical plant are operated by complicatedly connected various types of machines and electrical installations. Those large plants should always monitor signs of abnormalities leading to accidents in order to stably supply power by securing reliability. Accordingly, a monitoring device for detecting whether main parts constituting the plant are damaged in real time and for generating an alarm to a driver when the signs of abnormalities are detected in the parts is being used.

That is, a failure of a process in the plant causes undesired performance due to damage to the plant. Further, when the plant is destroyed, it may cause injury or death of people, and also cause environmental problems. Therefore, an early warning system capable of detecting failures early is indispensable.

Prediction of the failure of the plant for the early warning system is performed by using a failure prediction model. Here, degradation may occur as the plant is operated, and characteristics of the plant may change due to replacement of parts through maintenance. Accordingly, the failure prediction model generated initially decreases in accuracy over time.

The prediction of the failure of the plant for the early warning system is performed based on domain-knowledge. However, there is a problem that the failure of the plant cannot be accurately predicted due to the complexity of the plant, lack of good quality data and failure data, and incomplete use of failure detection/diagnosis information.

SUMMARY

Aspects of one or more exemplary embodiments provide a failure prediction model generating apparatus which selects an optimal failure prediction model from among a plurality of failure prediction models by using data collected from a plant and generates a new failure prediction model through the result of the prediction of the failure of the plant by using the selected optimal failure prediction model, and a method thereof.

Aspects of one or more exemplary embodiments also provide a plant failure prediction apparatus which selects one failure prediction model from among a physics-based failure prediction model and a data-based failure prediction model based on data collected from the plant and predicts the failure of the plant by using the selected failure prediction model.

Additional aspects will be set forth in part in the description which follows and, in part, will be apparent from the description, or may be learned by practice of the exemplary embodiments.

According to an aspect of an exemplary embodiment, there is provided a failure prediction method for a plant, the method including: storing a plurality of failure prediction models derived previously in a memory, collecting data measured from the plant, selecting at least one failure prediction model from among the plurality of failure prediction models using the collected data, and predicting a failure of the plant using the selected failure prediction model.

According to an aspect of another exemplary embodiment, there is provided a failure prediction apparatus for a plant including: a memory configured to store a plurality of failure prediction models derived previously and a processor configured to predict a failure of the plant. The processor is configured to collect data measured from the plant, select at least one failure prediction model from among the plurality of failure prediction models using the collected data, and predict a failure of the plant using the selected failure prediction model.

The failure prediction model generating apparatus and method thereof according to the exemplary embodiments can predict the failure of the plant using an optimal failure prediction model.

Also, it is possible to generate a new failure prediction model using a result of the prediction of the failure of the plant, thereby updating the failure prediction model for predicting the failure of the plant.

Further, it is possible to generate a new failure prediction model reflecting current conditions of the plant and to use the new failure prediction model in order to predict the failure of the plant, thereby increasing a reliability of the failure prediction.

In addition, it is possible to accurately predict the failure of the plant even in absence of expertise, failure examples and data on the configuration of the plant in which the failure has occurred.

BRIEF DESCRIPTION OF THE DRAWINGS

The above and other aspects will become more apparent from the following description of the exemplary embodiments with reference to the accompanying drawings, in which.

DETAILED DESCRIPTION OF EXEMPLARY EMBODIMENTS

Figure 1:
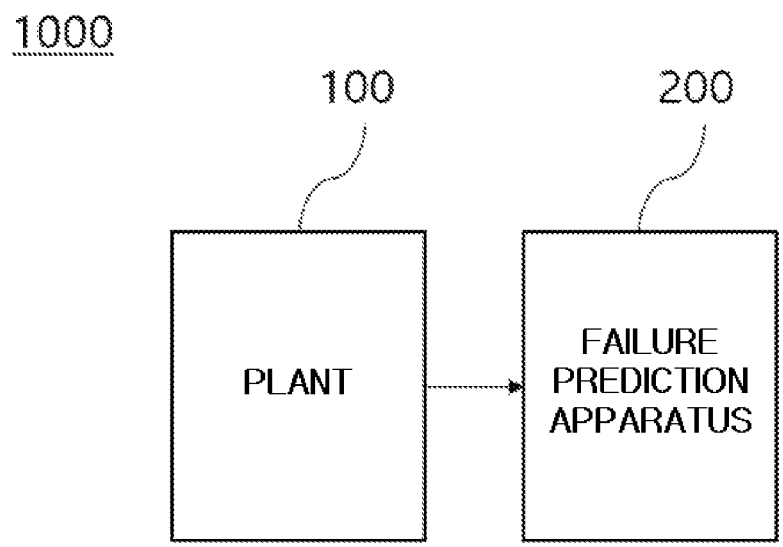
FIG. 1 is a view showing a configuration of a failure prediction system according to an exemplary embodiment.

Various changes and various exemplary embodiments will be described in detail with reference to the accompanying drawings so that those skilled in the art can easily carry out the disclosure. It should be understood, however, that the various embodiments are not for limiting the scope of the disclosure to the particular disclosed forms, but they should be interpreted to include all modifications, equivalents, and alternatives of the embodiments included within the sprit and technical scope disclosed herein.

The functional blocks illustrated in the drawings and described below are only examples of possible implementations. Other functional blocks may be used in other implementations without departing from the spirit and scope of the detailed description. Also, while one or more functional blocks of the present disclosure are represented by separate blocks, one or more of the functional blocks may be a combination of various hardware and software configurations that perform the same function.

Also, "a module," "a unit," or "a part" in the disclosure performs at least one function or operation, and these elements may be implemented as hardware, such as a processor or integrated circuit, software that is executed by a processor, or a combination thereof. Further, a plurality of "modules," a plurality of "units," or a plurality of "parts" may be integrated into at least one module or chip and may be implemented as at least one processor except for "modules," "units" or "parts" that should be implemented in a specific hardware.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

Further, terms such as "first," "second," and so on may be used to describe a variety of elements, but the elements should not be limited by these terms. The terms are used simply to distinguish one element from other elements. The use of such ordinal numbers should not be construed as limiting the meaning of the term. For example, the components associated with such an ordinal number should not be limited in the order of use, placement order, or the like. If necessary, each ordinal number may be used interchangeably.

Parts irrelevant to the description will be omitted for a clear description of the present disclosure. The same or similar reference numerals will be assigned to the same or similar components throughout the specification.

Unless otherwise defined, all terms including technical and scientific terms used herein have the same meaning as commonly understood by one of ordinary skill in the art to which the present disclosure belongs. Commonly used terms defined in the dictionary are additionally construed as having meanings conforming to related technology documents and currently disclosed contents. As long as terms are not clearly defined, the terms should not be ideally or excessively construed as formal meaning.

Hereinafter, exemplary embodiments will be described in detail with reference to the accompanying drawings.

FIG. 1 is a view showing a configuration of a failure prediction system according to an exemplary embodiment.

Referring to FIG. 1, the failure prediction system 1000 according to the exemplary embodiment may include a plant 100 and a failure prediction apparatus 200.

The failure prediction apparatus 200 may select an optimal failure prediction model from among a plurality of failure prediction models using data collected from the plant 100, and predict a failure of the plant 100 using the selected optimal failure prediction model.

The failure prediction apparatus 200 may select the optimal failure prediction model from among the plurality of failure prediction models including a physical failure prediction model and a data-based failure prediction model using the data collected from the plant 100, and predict the failure of the plant 100 using the selected optimal failure prediction model.

Here, the data collected from the plant 100 may include a temperature, pressure and humidity, NOx, SOx, O2, displacement, efficiency, and power generation output for components included in the plant 100. Also, the data collected from the plant 100 is related to the state of the plant 100, and may include data collected from the plant 100 at a previous time point and data collected from the plant 100 at a current time point.

The failure prediction apparatus 200 may determine when and where a failure occurs in the plant 100, and determine a cause of the failure in the plant, an expected alarm level, a predicted value, and a trend, using the optimal prediction model selected based on the data collected from the plant 100. Accordingly, the failure prediction apparatus 200 may predict the failure of the plant 100 more accurately by detecting the failure and using diagnosis information.

Also, the failure prediction apparatus 200 generates a new failure prediction model based on a result of the prediction of the failure of the plant 100. Then, when a failure of the plant 100 is predicted, the failure prediction apparatus 200 may increase the reliability of the result of the failure prediction by additionally using a new failure prediction model.

Figure 2:
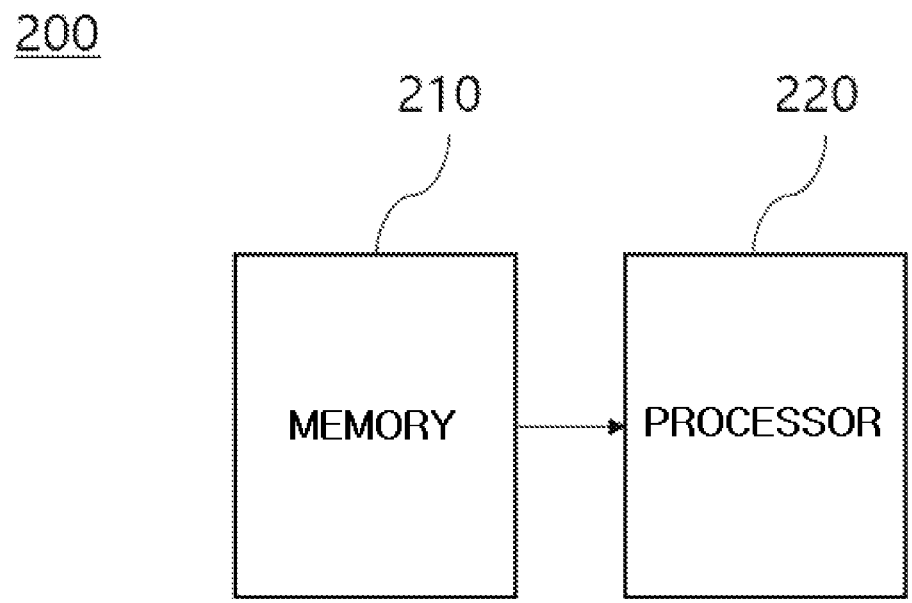
FIG. 2 is a diagram showing a configuration of a failure prediction apparatus according to an exemplary embodiment.

FIG. 2 is a diagram showing a configuration of a failure prediction apparatus according to an exemplary embodiment.

Referring to FIG. 2, the failure prediction apparatus 200 according to the exemplary embodiment may include a memory 210 and a processor 220.

The memory 210 may store the failure prediction model. Here, the failure prediction model may include an existing failure prediction model used to predict the failure of the plant 100 and a failure prediction model newly generated using the result of the prediction of the failure of the plant 100.

Alternatively, the failure prediction model may include a first model group that is a physics-based model and a second model group that is a data-based model. The first model group is a group of first models based on laws of physics and may be a model that outputs a determined value for a specific value. The second model group is a group of second models based on data and may be a model that analyzes and outputs stored data for a specific value.

The processor 220 may collect data from the plant 100 and analyze the collected data. Here, the data collected from the plant 100 may include a temperature, pressure and humidity, NOx, SOx, O2, displacement, efficiency, and power generation output for components included in the plant 100. Also, the data collected from the plant 100 is related to the state of the plant 100, and may include data collected from the plant 100 at a previous time point and data collected from the plant 100 at a current time point.

The processor 220 may generate new feature data based on the collected data. For example, the processor 220 may generate feature data for an average value, a minimum/maximum value, etc., based on the collected data. Also, the processor 220 may analyze a correlation between the collected data and the generated data to analyze changes and trends in data.

The processor 220 may classify the data collected from the plant 100 into an input data and an output data. For example, the power generation output may vary according to the temperature, pressure, and humidity for specific components included in the plant 100, and the processor 220 may collect the temperature, pressure, humidity, and power generation output for the specific components. Here, the power generation output may be a final result and may be a parameter that can determine whether a specific component has failed. For example, when the power generation output is less than a certain value, the power generation output may be an index for determining whether a failure has occurred, such as determining that a failure has occurred in the specific component. Accordingly, the processor 220 may classify the data for the power generation output as an output data.

Meanwhile, the temperature, pressure, and humidity for the specific component may be a parameter that affects the final result. For example, as the temperature, pressure, and humidity for the specific component change, the power generation output, i.e., the final result, may also change. Accordingly, the processor 220 may classify the temperature, pressure, and humidity for the specific component as an input data.

According to a first exemplary embodiment, the processor 220 may select the optimal failure prediction model from among a plurality of failure prediction models using the data collected from the plant 100. For example, the processor 220 may obtain the plurality of failure prediction models from the memory 210. The processor 220 may select a failure prediction model having a value most similar to the collected data among output values of the obtained failure prediction models as the optimal failure prediction model. For example, the processor 220 may select the optimal failure prediction model using a result of dividing the data collected from the plant 100 into the input data and the output data. The processor 220 may set the input data as input values of the failure prediction models and compare the output values output from the failure prediction models by the input value with the output data.

As a result of comparing the output value output from each of the failure prediction models with the output data, the processor 220 may select a failure prediction model having the smallest residual as the optimal failure prediction model.

Figure 3:
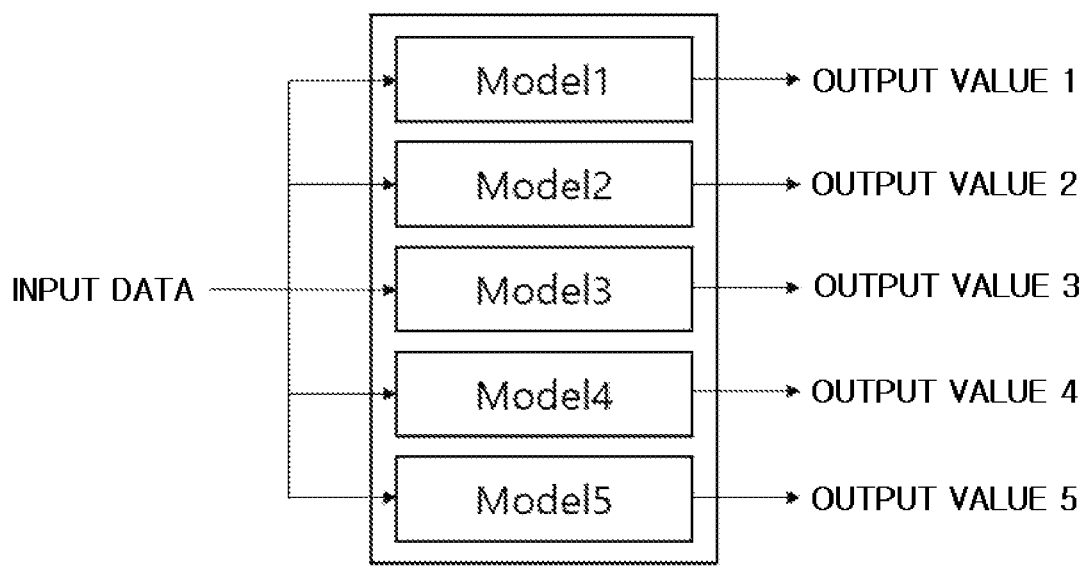
FIG. 3 is a view showing an example of obtaining an output value from the failure prediction model to select an optimal failure prediction model according to a first exemplary embodiment.

FIG. 3 is a view showing an example of obtaining an output value from the failure prediction model to select the optimal failure prediction model according to a first exemplary embodiment.

Referring to FIG. 3, the memory 210 may store a previously derived failure prediction model.

The processor 220 may collect data from the plant 100 and classify the collected data into an input data and an output data based on characteristics of the data. Here, the output data may be data that can determine a failure of a specific component of the plant 100, and the input data may be data that affects the output data.

The processor 220 may obtain failure prediction models Model1 to Model5 stored in the memory 210. The processor 220 may input an input data to each of the obtained failure prediction models Model1 to Model5. Here, the obtained failure prediction models Model1 to Model5 may output an output value for the input data.

For example, the first failure prediction model Model1 may output an output value 1 for the input data, the second failure prediction model Model2 may output an output value 2 for the input data, the third failure prediction model Model3 may output an output value 3 for the input data, the fourth failure prediction model Model4 may output an output value 4 for the input data, and the fifth failure prediction model Model5 may output an output value 5 for the input data.

Figure 4:
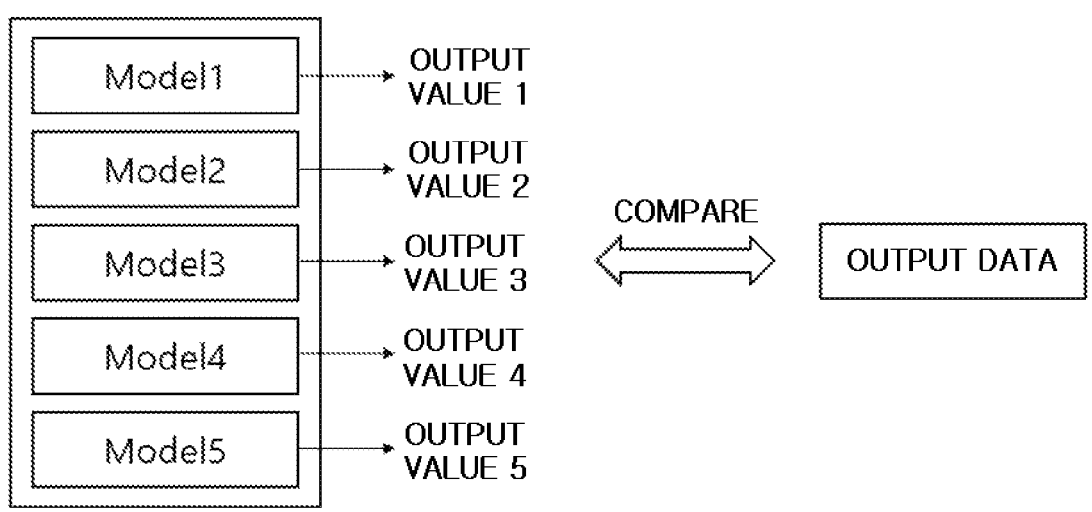
FIG. 4 is a view showing an example of comparing output values of the failure prediction models with output data to select an optimal failure prediction model in accordance with the first exemplary embodiment.

FIG. 4 is a view showing an example of comparing output values of the failure prediction models with output data to select the optimal failure prediction model in accordance with the first exemplary embodiment.

Referring to FIG. 4, the processor 220 may compare the output value output from each of the failure prediction models Model1 to Model5 with the output data.

That is, the processor 220 may compare the output value 1 output from the first failure prediction model Model1 with the output data, compare the output value 2 output from the second failure prediction model Model2 with the output data, compare the output value 3 output from the third failure prediction model Model3 with the output data, compare the output value 4 output from the fourth failure prediction model Model4 with the output data, and compare the output value 5 output from the fifth failure prediction model Model5 with the output data.

Figures 5, 6:
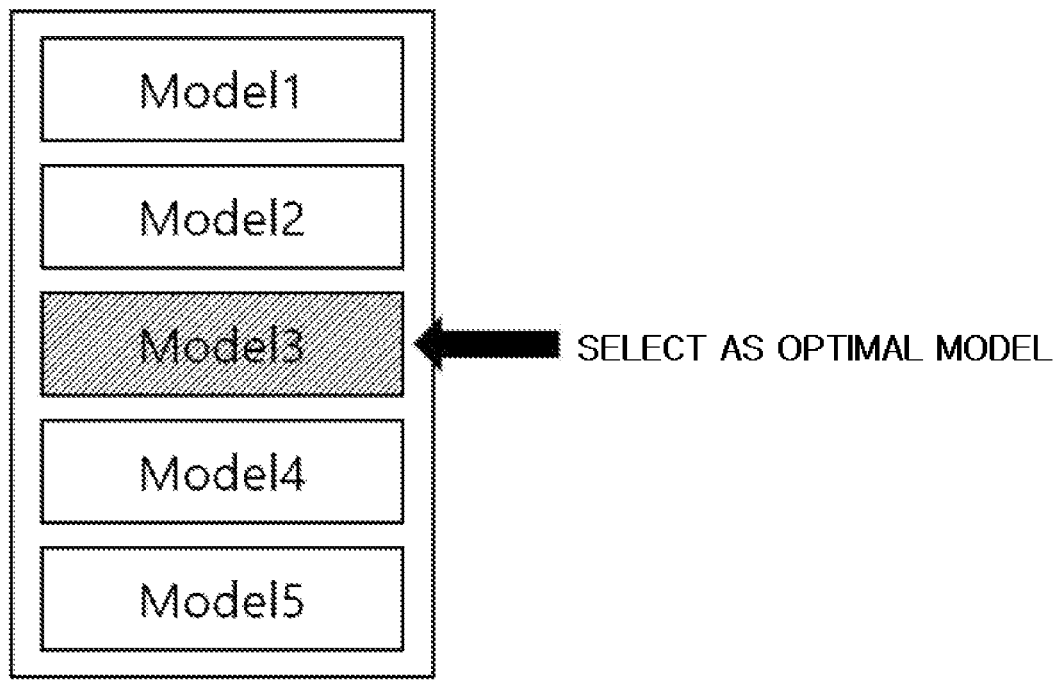
FIG. 5 is a view showing a residual as a result of comparing the output values of the failure prediction models with the output data to select the optimal failure prediction model in accordance with the first exemplary embodiment.
FIG. 6 is a view showing an example of selecting an optimal failure prediction model based on the residual between the output values of the failure prediction models and the output data in accordance with the first exemplary embodiment.

FIG. 5 is a view showing a residual as a result of comparing the output values of the failure prediction models with the output data to select the optimal failure prediction model in accordance with the first exemplary embodiment.

Referring to FIG. 5, the processor 220 may compare each of the output values output from the failure prediction models Model1 to Model5 with the output data, and calculate a residual between each of the output values output from the failure prediction models Model1 to Model5 and the output data.

For example, a residual between the output data and the output value 1 output from the first failure prediction model Model1 may be 10, a residual between the output data and the output value 2 output from the second failure prediction model Model2 may be 8, a residual between the output data and the output value 3 output from the third failure prediction model Model3 may be 2, a residual between the output data and the output value 4 output from the fourth failure prediction model Model4 may be 3, and a residual between the output data and the output value 5 output from the fifth failure prediction model Model5 may be 6.

FIG. 6 is a view showing an example of selecting the optimal failure prediction model based on the residual between the output values of the failure prediction models and the output data in accordance with the first exemplary embodiment.

Referring to FIG. 6, the processor 220 may select the optimal failure prediction model based on a result of comparing the output data and the output value output from each of the failure prediction models Model1 to Model5.

The processor 220 may select the third failure prediction model Model3 having the smallest residual with the output data among the output values output from the failure prediction models Model1 to Model5 as the optimal failure prediction model. The selected optimal failure prediction model is the most similar to the current state of the plant 100. By using this, it is possible to more accurately predict the failure of the plant 100.

Figure 7:
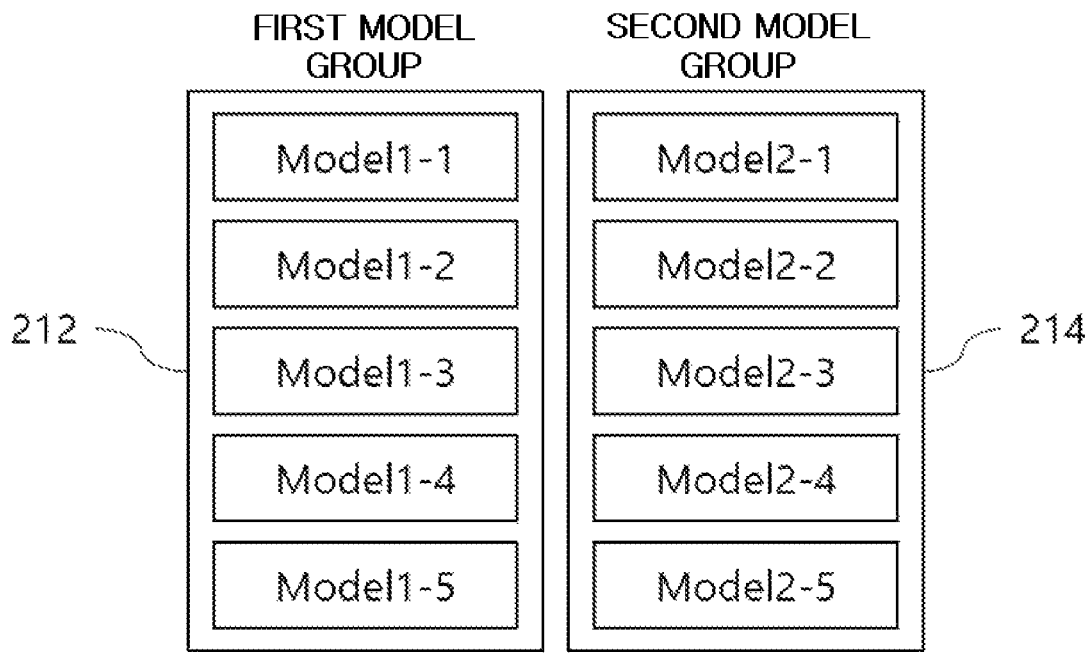
FIG. 7 is a view showing an example of previously derived failure prediction models stored in a memory to select an optimal failure prediction model according to a second exemplary embodiment.

FIG. 7 is a view showing an example of previously derived failure prediction models stored in a memory to select an optimal failure prediction model according to a second exemplary embodiment.

According to the second exemplary embodiment, the processor 220 may select a model group for predicting the failure of the plant 100 from among a first model group and a second model group based on the collected data. For example, the processor 220 may select a model group from among the first model group and the second model group in accordance with the number of collected data. For example, the processor 220 may select the second model group when the number of data collected from the plant 100 is equal to or greater than a pre-determined number, and select the first model group when the number of data collected from the plant 100 is less than the pre-determined number.

Here, if the data collected from the plant 100 is sufficient to predict the failure of the plant 100, the processor 220 may predict the failure of the plant 100 using the collected data. That is, the processor 220 may select the second model group for predicting the failure of the plant 100 based on the data.

If the data collected from the plant 100 is not sufficient to predict the failure of the plant 100, the processor 220 may predict the failure of the plant 100 using the laws of physics. That is, the processor 220 may select the first model group for predicting the failure of the plant 100 based on the laws of physics.

If the second model group is selected, the processor 220 may select at least one second model from among the second models included in the second model group in accordance with the number of data. For example, each of the second models included in the second model group may match the number of data. The processor 220 may select the second model corresponding to the number of data collected from the plant 100 as the failure prediction model.

Also, the second models in which the number of data matched to the second model is less than the number of data collected from the plant 100 may be selected as the failure prediction model by the processor 220. For example, the number of data matched to the second model may be the number of data required to use the corresponding model. Accordingly, since the number of data matched to each model means the minimum number of data, the failure prediction can be performed in the case of the second model in which the number of data collected from the plant 100 is greater than the number of matched data. That is, the processor 220 may select all second models in which the number of matched data is less than the number of data collected from the plant 100 as the failure prediction model.

If the first model group is selected, the processor 220 may select at least one first model from among the first models included in the first model group using the data collected from the plant 100. The processor 220 may select at least one first model from among the first models included in the first model group using the result of dividing the data collected from the plant 100 into the input data and the output data. The processor 220 may set the input data as input values of the first models, and compare the output values output from the first models by the input values with the output data.

As a result of comparing the output value output from the first models with the output data, the processor 220 may select a first model having the smallest residual between the output value and the output data as the failure prediction model.

In addition, the processor 220 may select at least one model from the first model group and the second model group, respectively, and derive a new model through a combination of the first model group and the second model group. For example, the processor 220 may select one first model from among the models included in the first model group and select one second model from among the models included in the second model group. The processor 220 may derive a new failure prediction model through a combination of the selected first model and the second model. However, it is understood that the number of models to be combined is not limited thereto. For example, the number of the models selected for each model group may not be the same.

Referring to FIG. 7, the memory 210 may store the first model group 212 and the second model group 214. Here, the first model is a model based on the laws of physics, and the first models based on the laws of physics are grouped and stored as the first model group 212 in the memory 210. The second model is a data-based model, and the second models based on data are grouped and stored as the second model group 214 in the memory 210. The first model may output a value determined for a specific value, and the second model may analyze stored data for the specific value and output a value.

Figure 8:
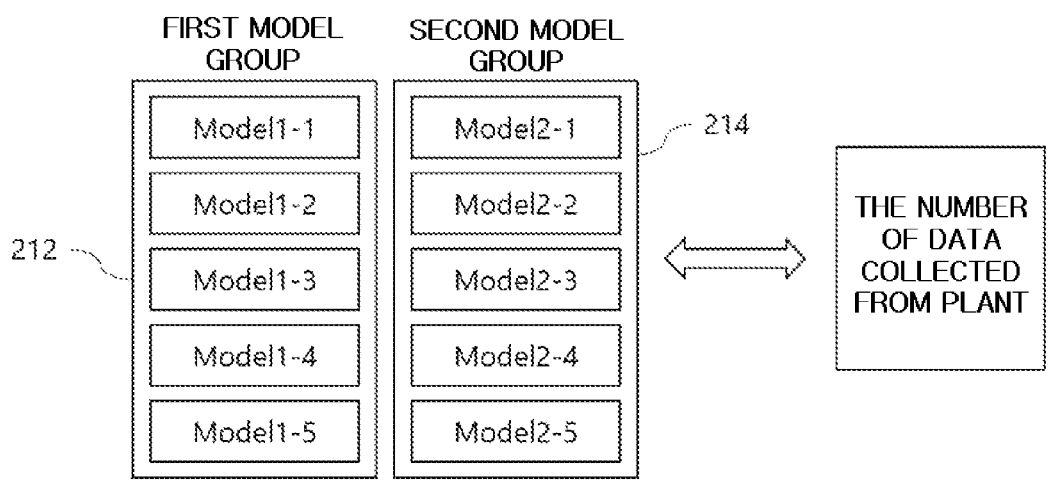
FIG. 8 is a view showing an example of selecting a model group based on a number of data collected from a plant in accordance with the second exemplary embodiment.

FIG. 8 is a view showing an example of selecting a model group based on the number of data collected from the plant 100 in accordance with the second exemplary embodiment.

Referring to FIG. 8, the processor 220 may select a prediction model group for predicting the failure of the plant 100 from among the first model group 212 or the second model group 214 in accordance with the number of data collected from the plant 100.

For example, the processor 220 may determine whether the number of data collected from the plant 100 is greater than or equal to a pre-determined number and select the first model group 212 or the second model group 214 in accordance with the determination result.

For example, the processor 220 may select the second model group 214 when the number of data collected from the plant 100 is greater than the pre-determined number and select the first model group 212 when the number of data collected from the plant 100 is less than the pre-determined number. If the pre-determined number is N and the number of data collected from the plant 100 is N+1000, it is determined that the number of data collected from the plant 100 is equal to or greater than the pre-determined number, and the second model group 214 may be selected. If the pre-determined number is N and the number of data collected from the plant 100 is N−100, it is determined that the number of data collected from the plant 100 is less than the pre-determined number, and the first model group 212 may be selected.

Figure 9:
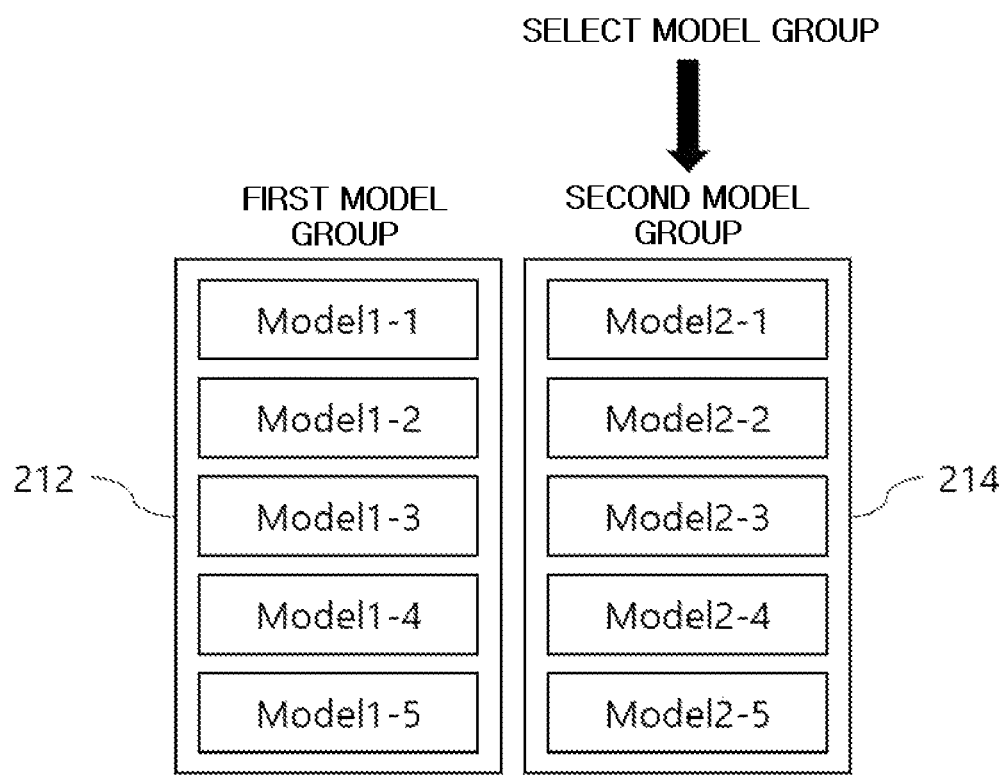
FIG. 9 is a view showing an example of a result of selecting a model group based on the number of data collected from the plant in accordance with the second exemplary embodiment.

FIG. 9 is a view showing an example of a result of selecting a model group based on the number of data collected from the plant 100 in accordance with the second exemplary embodiment.

Referring to FIG. 9, if the data collected from the plant 100 is sufficient to predict the failure of the plant 100, the processor 220 may predict the failure of the plant 100 using the collected data, and select the second model group 214 for predicting the failure of the plant 100 based on the data.

On the other hand, if the data collected from the plant 100 is not sufficient to predict the failure of the plant 100, the processor 220 may predict the failure of the plant 100 using the laws of physics, and select the first model group 212 for predicting the failure of the plant 100 based on the laws of physics.

In FIG. 9, the number of data collected from the plant 100 is greater than or equal to a pre-determined number, and the processor 220 determines that the failure of the plant 100 can be predicted by using the collected data and may select the second model group 214 that predicts the failure of the plant 100 based on the data.

Figure 10:
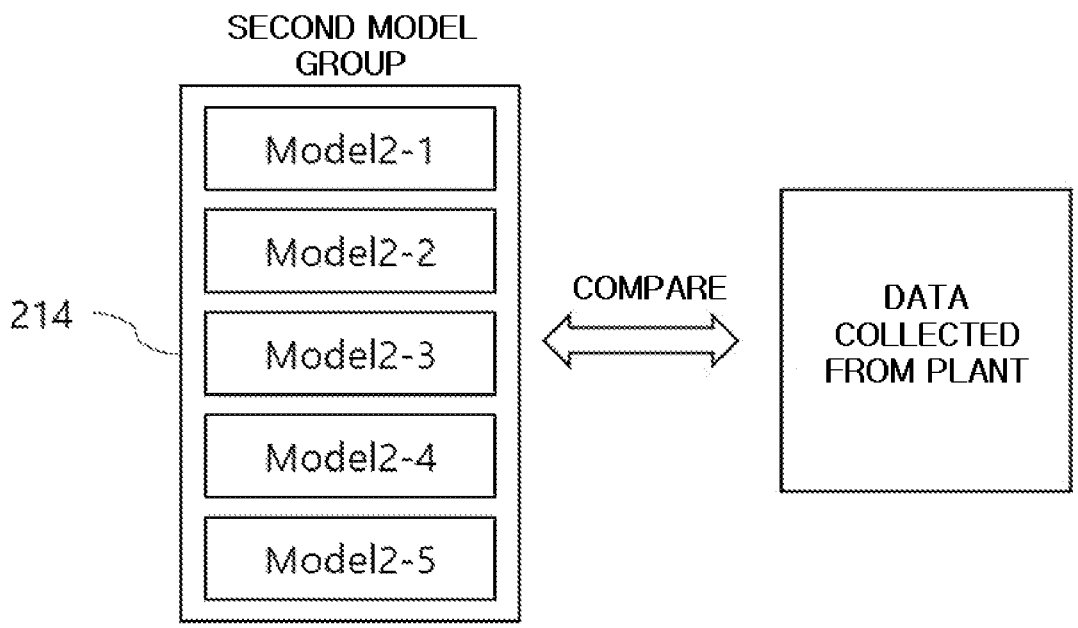
FIG. 10 is a view showing an example of comparing output values of the failure prediction models of the selected failure prediction group with data collected from the plant to select the optimal failure prediction model in accordance with the second exemplary embodiment.

FIG. 10 is a view showing an example of comparing the output values of the failure prediction models of the selected failure prediction group with the data collected from the plant to select the optimal failure prediction model in accordance with the second exemplary embodiment.

Referring to FIG. 10, the processor 220 may obtain failure prediction models included in the selected model group from the memory 210. For example, if the number of data collected from the plant 100 is N+100, because the number of data collected from the plant 100 is greater than the pre-determined number N, the processor 220 may select the second model group 214 and obtain the second models included in the second model group 214 from the memory 210.

If the second model group 214 is selected as shown in FIG. 10, the processor 220 may select at least one second model from among the second models included in the second model group 214 in accordance with the number of data. For example, each of the second models included in the second model group 214 is matched to the number of data and is stored in the memory 210. The processor 220 may compare the data collected from the plant 100 with the number of data matched to each of the second models.

Figure 11:
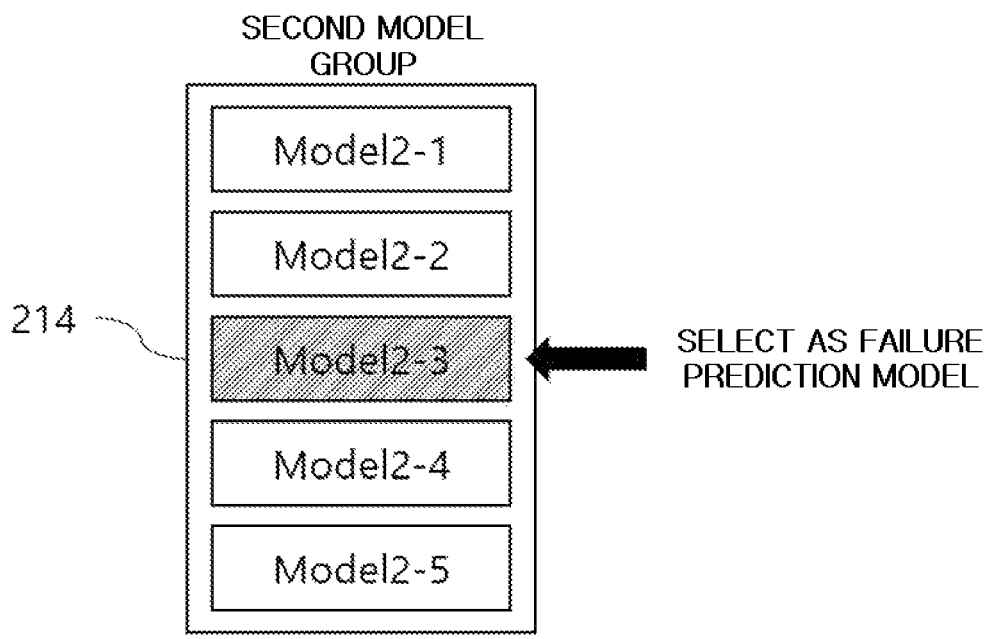
FIG. 11 is a view showing an example of selecting the optimal failure prediction model in accordance with the second exemplary embodiment.

FIG. 11 is a view showing an example of selecting the optimal failure prediction model in accordance with the second exemplary embodiment.

Referring to FIG. 11, the processor 220 may select at least one model from among the models included in the selected model group. If the second model group 214 is selected, the processor 220 may select at least one second model from among the second models included in the second model group 214 in accordance with the number of data. For example, the second model 1 (Mdel2-1) may be matched to the number of data N−1000 and stored in the memory 210, the second model 2 (Model2-2) may be matched to the number of data N−500 and stored in the memory 210, the second model 3 (Model2-3) may be matched to the number of data N and stored in the memory 210, the second model 4 (Model2-4) may be matched to the number of data N+500 and stored in the memory 210, and the second model 5 (Model2-5) may be matched to the number of data N+1000 and stored in the memory 210.

The processor 220 may select a model corresponding to the number of data collected from the plant 100 as the failure prediction model. For example, if the number of data collected from the plant 100 is N, the processor 220 may select the second model 3 (Model2-3) including the number of data N as the failure prediction model.

Also, the processor 220 may select a model matching the number of data less than the number of data collected from the plant 100 as the failure prediction model. For example, if the number of data collected from the plant 100 is N, the second model 3 (Model2-3) including the number of data N collected from the plant 100, and the second model 1 (Model2-1) and the second model 2 (Model2-2) which match the number of data less than the number of data N collected from the plant 100 may be selected as a failure prediction model by the processor 220.

Alternatively, if the number of data collected from the plant 100 is N−100, because the number of data collected from the plant 100 is less than the pre-determined number N, the processor 220 may select the first model. The processor 220 may obtain the first models included in the first model group 212 from the memory 210.

The processor 220 may select at least one of the first models included in the selected first model group 212 as the optimal failure prediction model.

If the first model group 212 is selected, the processor 220 may select the optimal failure prediction model according to the method described in the first exemplary embodiment. For example, the processor 220 may select at least one first model from among the first models included in the first model group 212 using the result of dividing the data collected from the plant 100 into the input data and the output data. The processor 220 may set the input data as input values of the first models, and compare the output values output from the first models by the input values with the output data.

As a result of comparing the output value output from the first models with the output data, the processor 220 may select a first model having the smallest residual between the output value and the output data as the failure prediction model.

The processor 220 may verify the performance of the selected failure prediction model using a previously collected and stored data set. Here, the data set may be data collected from the plant 100 in the past, and the input data and the output data may be matched and stored in the data set.

The processor 220 may input the input data of the data set to the selected failure prediction model, and compare the output value output from the selected failure prediction model and the output data matching the input data. As a result of comparing the output value output from the selected failure prediction model and the output data, if the residual between the output value and the output data is greater than or equal to a certain value, the processor 220 may determine that the performance of the selected failure prediction model is low, and if the residual between the output value and the output data is less than the certain value, the processor 220 may determine that the performance of the selected failure prediction model is high.

Here, if the residual between the output value and the output data is less than the certain value, the selected failure prediction model outputs a value similar to the output data, and the processor 220 may determine that the selected failure prediction model has a good performance. If the residual between the output value and the output data is greater than or equal to the certain value, the selected failure prediction model outputs a value which is not similar to the output data, and the processor 220 may determine that the performance of the selected failure prediction model is not good.

When the performance of the selected failure prediction model is not good, the processor 220 may reselect a failure prediction model using the data collected from the plant 100.

If it is verified that the selected failure prediction model has a good performance, the processor 220 may select the corresponding failure prediction model as the optimal failure prediction model.

The processor 220 may predict the failure of the plant 100 using the selected optimal failure prediction model in accordance with the first exemplary embodiment or the second exemplary embodiment.

The processor 220 may predict a prediction value and a trend for a specific point in time, when and where a failure is expected to occur, a cause of the failure, and an alarm level. That is, the processor 220 may predict an output value at a specific time point in the future by inputting input data for a future time point as an input value to the optimal failure prediction model according to the current state of the plant 100.

For example, if a current engine RPM (Revolutions per minute) is continuously increasing, the engine RPM at a specific time in the future may be estimated based on the degree of increase. The processor 220 may input the estimated engine RPM as an input value of the selected failure prediction model, and predict the failure of the plant based on the output value.

The processor 220 may evaluate the performance of the optimal failure prediction model by using the result of the prediction of the failure of the plant 100. The processor 220 may evaluate how accurate the result of the prediction of the failure is by using the optimal failure prediction model. The processor 220 may compare a predicted value predicting data to be collected from the plant 100 at a specific time point by using the optimal failure prediction model and a measured value collected from the plant 100 at a real specific time point. That is, the processor 220 may compare the predicted value and the measured value and calculate a residual between the predicted value and the measured value. If the calculated residual is greater than or equal to a certain value, the performance of the optimal failure prediction model may be evaluated as low by the processor 220. If the residual between the predicted value and the measured value is less than the certain value, the performance of the optimal failure prediction model may be evaluated as high by the processor 220.

Here, if the residual between the predicted value and the measured value is less than the certain value, because the optimal failure prediction model predicts a value similar to the measured value, the processor 220 may evaluate that the optimal failure prediction model has a good performance. If the residual between the predicted value and the measured value is greater than or equal to the certain value, because the optimal failure prediction model predicts a value that is not similar to the measured value, the processor 220 may evaluate that the performance of the optimal failure prediction model is not good.

The processor 220 may process the data to update the failure prediction model based on the result of evaluating the failure prediction model. As a result of predicting by the failure prediction model, the processor 220 may process the data that can be used to generate the failure prediction model among the data collected from the plant 100. That is, the processor 220 may process only reliable data, excluding noise data, as data that can be used to generate the failure prediction model.

Here, the processor 220 may store the data that can be used for learning the failure prediction model in the memory 210. The storage space of the memory 210 has a certain size, and there may be no more space to be stored in the memory 210. In this case, the processor 220 may sequentially delete data in the order of the oldest data stored in the memory 210, and data that can be used for learning the failure prediction model is stored in a remaining storage space due to the deletion of the data. Also, the data that can be used for learning the failure prediction model may be sequentially stored in the order in which they are stored.

The processor 220 may set a structure of a new failure prediction model to be generated. The processor 220 may set an order of an equation, a parameter, and whether it is linear or nonlinear, and may set whether to consider time delay. In other words, the processor 220 may set values for generating the new failure prediction model.

The processor 220 may generate the failure prediction model based on the set values of the failure prediction model. That is, the processor 220 may generate the failure prediction model by reflecting the set structure, the order of the equation, the parameter, whether it is linear or nonlinear, and whether to consider time delay, etc.

The processor 220 may verify the performance of the generated failure prediction model by using the result of dividing the data collected from the plant 100 into the input data and the output data. The processor 220 may set the input data as an input value of the generated failure prediction model and compare the output value output from the generated failure prediction model by the input value with the output data.

As a result of comparing the output value of the generated failure prediction model and the output data, if the residual between the output value and the output data is greater than or equal to a certain value, the processor 220 may verify that the performance of the generated failure prediction model is low, and if the residual between the output value of the generated failure prediction model and the output data is less than the certain value, the processor 220 may verify that the performance of the generated failure prediction model is high.

Here, if the residual between the output value and the output data is less than the certain value, the generated failure prediction model outputs a value similar to the output data, and the processor 220 may verify that the generated failure prediction model has a good performance. If the residual between the output value and the output data is greater than or equal to the certain value, the generated failure prediction model outputs a value which is not similar to the output data, and the processor 220 may verify that the performance of the generated failure prediction model is not good.

The processor 220 may determine whether to store a new failure prediction model based on the result of evaluating the performance of the new failure prediction model. As a result of evaluating the performance of the new failure prediction model, if the performance is evaluated as good, the processor 220 may store the new failure prediction model. If the performance is evaluated as poor, the processor 220 may not store the new failure prediction model. Accordingly, the processor 220 may update the failure prediction model stored in the memory 210 as a failure prediction model with a good performance. As a result, the failure of the plant 100 can be predicted by using the failure prediction model suitable for the current state of the plant 100.

The failure prediction model generating apparatus 200 according to the exemplary embodiments selects an optimal failure prediction model from among the plurality of failure prediction models using the data collected from the plant 100 and generates a new failure prediction model through the result of the prediction of the failure of the plant 100 using the selected optimal failure prediction model.

Figure 12:
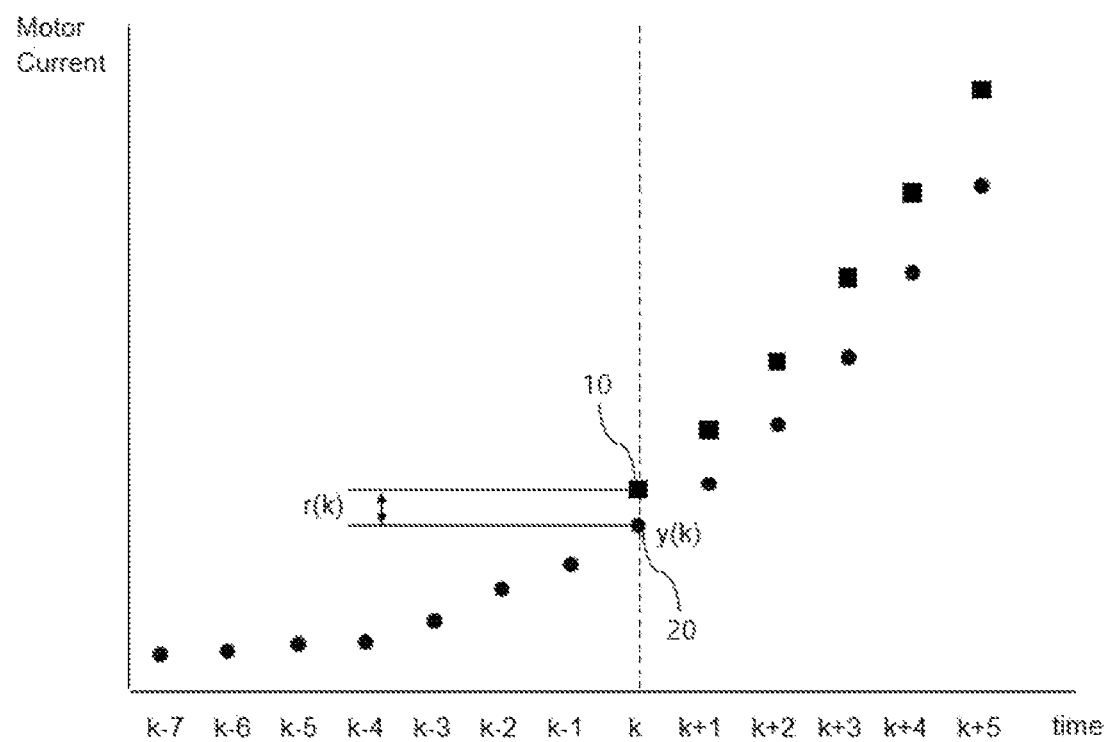
FIG. 12 is a view showing evaluating a performance of the optimal failure prediction model according to an exemplary embodiment.

FIG. 12 is a view showing evaluating the performance of the optimal failure prediction model according to an exemplary embodiment.

Referring to FIG. 12, the processor 220 may evaluate the performance of the optimal failure prediction model. The processor 220 may predict data to be collected from the plant 100 at a specific time point by using the optimal failure prediction model. The processor 220 may compare the predicted value predicted by the optimal failure prediction model with the measured value collected from the plant 100 at a specific time point. For example, the processor 220 may compare the predicted value and the measured value and calculate the residual between the predicted value and the measured value. If the calculated residual is greater than or equal to a certain value, the performance of the optimal failure prediction model may be evaluated as low by the processor 220. If the residual between the predicted value and the measured value is less than the certain value, the performance of the optimal failure prediction model may be evaluated as high by the processor 220.

For example, the data measured from the plant 100 may be collected by the processor 220 at a certain time interval. That is, the processor 220 may collect data at "k", i.e., at a current time point, and may have collected data at "k−1" which is earlier than "k" for a certain period of time. Also, the processor 220 may have collected data at "k−2" which is earlier than "k−1" for a certain period of time. According to this, values from "k−7" to "k−1" may be measured from the plant 100 at the corresponding time point.

Here, the optimal failure prediction model may predict, at the time point "k−1", the data to be measured at the time point "k" in the plant 100. The processor 220 may predict a predicted value 10 at the time point "k" by using the optimal failure prediction model and compare the predicted value 10 at the time point "k" with a measured value 20 of the plant 100 at the time point "k". The processor 220 may calculate a residual r(k) between the predicted value 10 at the time point "k" and the measured value 20 at the time point "k". If the calculated residual is greater than or equal to a certain value, the performance of the optimal failure prediction model may be evaluated as low by the processor 220. If the calculated residual is less than the certain value, the performance of the optimal failure prediction model may be evaluated as high by the processor 220.

As a result of evaluating the performance of the optimal failure prediction model, if the performance is evaluated as good, the processor 220 may not generate a new failure prediction model, and if the performance of the optimum failure prediction model is evaluated as poor, the processor 220 may process the data collected to generate the failure prediction model and set the structure of the failure prediction model to be generated.

Figure 13:
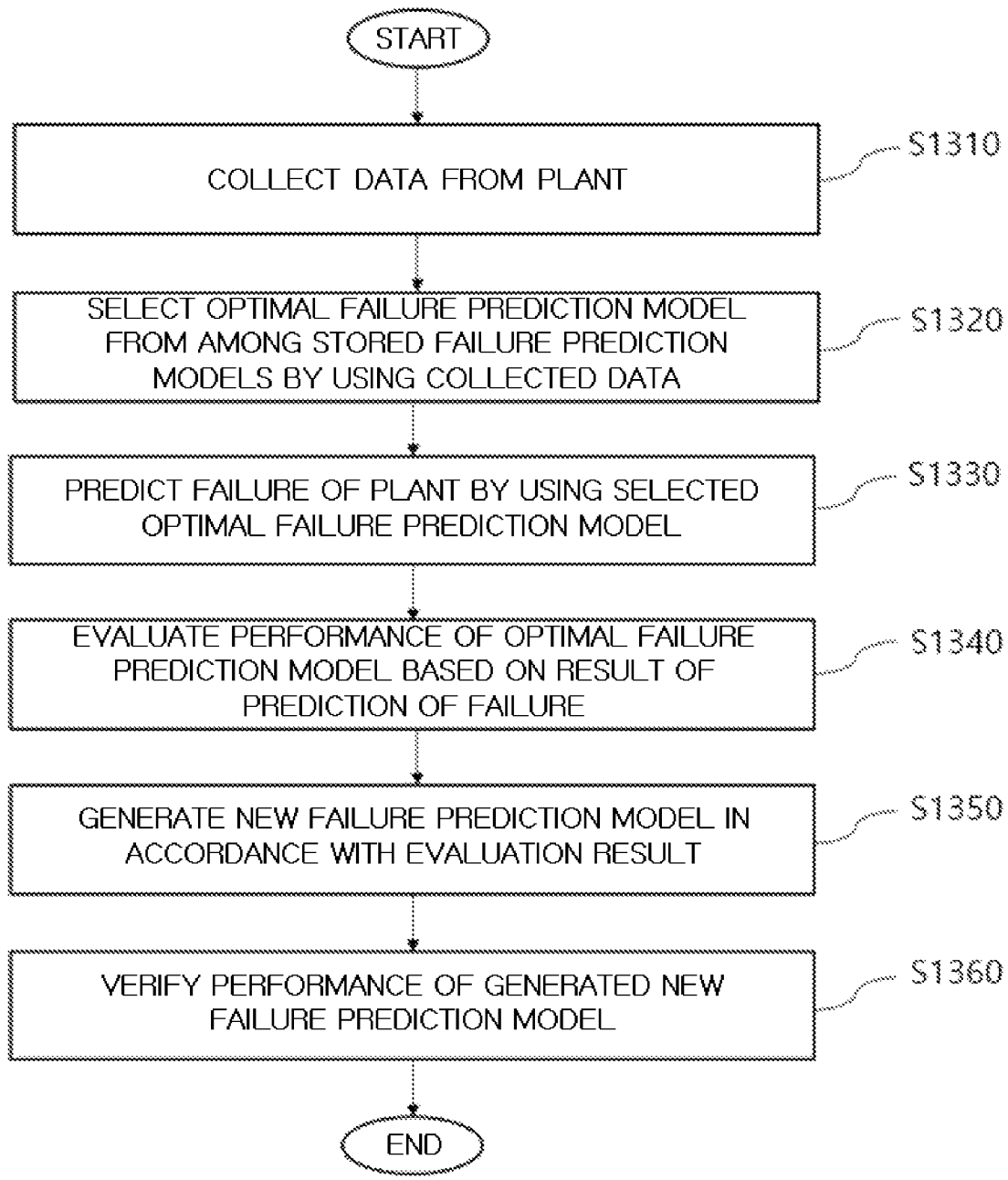
FIG. 13 is a view showing a failure prediction method according to a third exemplary embodiment.

FIG. 13 is a view showing a failure prediction method according to a third exemplary embodiment.

Referring to FIG. 13, the processor 220 may collect data from the plant 100 (operation S1310). The data collected from the plant 100 may include a temperature, pressure and humidity, NOx, SOx, O2, displacement, efficiency, and power generation output for specific components included in the plant 100. Also, the data collected from the plant 100 is related to the state of the plant 100, and may include data collected from the plant 100 at a previous time point and data collected from the plant 100 at a current time point.

The processor 220 may classify the data collected from the plant 100 into an input data and an output data. For example, the output data may be a final result and may be a parameter that can determine a failure of the specific component. The input data may be a parameter that affects the final result for a specific component.

The processor 220 may select the optimal failure prediction model from among the stored failure prediction models by using the collected data (operation S1320). The processor 220 may select the optimal failure prediction model by using the result of dividing the data collected from the plant 100 into the input data and the output data. The processor 220 may set the input data as input values of the failure prediction models and compare the output values output from the failure prediction models by the input value with the output data.

As a result of comparing the output value output from each of the failure prediction models with the output data, the processor 220 may select a failure prediction model having the smallest residual as the optimal failure prediction model.

The processor 220 may predict the failure of the plant 100 by using the selected optimal failure prediction model (operation S1330). The processor 220 may predict a prediction value and a trend for a specific time point, when and where a failure is expected to occur, a cause of the failure, and an alarm level. That is, the processor 220 may predict an output value at a specific time point in the future by inputting input data for a future time point as an input value to the optimal failure prediction model according to the current state of the plant 100.

The processor 220 may evaluate a performance of the optimal failure prediction model based on the result of the prediction of the failure (operation S1340). The processor 220 may compare a predicted value predicting data to be collected from the plant 100 at a specific time point by using the optimal failure prediction model and a measured value collected from the plant 100 at a real specific time point. That is, the processor 220 may compare the predicted value and the measured value and calculate a residual between the predicted value and the measured value. If the calculated residual is greater than or equal to a certain value, the performance of the optimal failure prediction model may be evaluated as low by the processor 220. If the residual between the predicted value and the measured value is less than the certain value, the performance of the optimal failure prediction model may be evaluated as high by the processor 220.

The processor 220 may generate a new failure prediction model in accordance with the result of evaluating the performance of the optimal failure prediction model (operation S1350). As a result of evaluating the performance of the optimal failure prediction model, if the performance of the optimal failure prediction model is evaluated as high, the processor 220 does not generate a new failure prediction model. If the performance of the optimal failure prediction model is evaluated as low, the processor 220 may generate a new failure prediction model.

The processor 220 may verify a performance of the newly generated failure prediction model (operation S1360). The processor 220 may verify the performance of the new failure prediction model by using the result of dividing the data collected from the plant 100 into the input data and the output data. The processor 220 may set the input data as an input value of the new failure prediction model and compare the output value output from the new failure prediction model by the input value with the output data.

As a result of comparing the output value of the new failure prediction model and the output data, if a residual between the output value and the output data is greater than or equal to a certain value, the processor 220 may verify that the performance of the new failure prediction model is low, and if the residual between the output value of the new failure prediction model and the output data is less than the certain value, the processor 220 may verify that the performance of the new failure prediction model is high.

Figure 14:
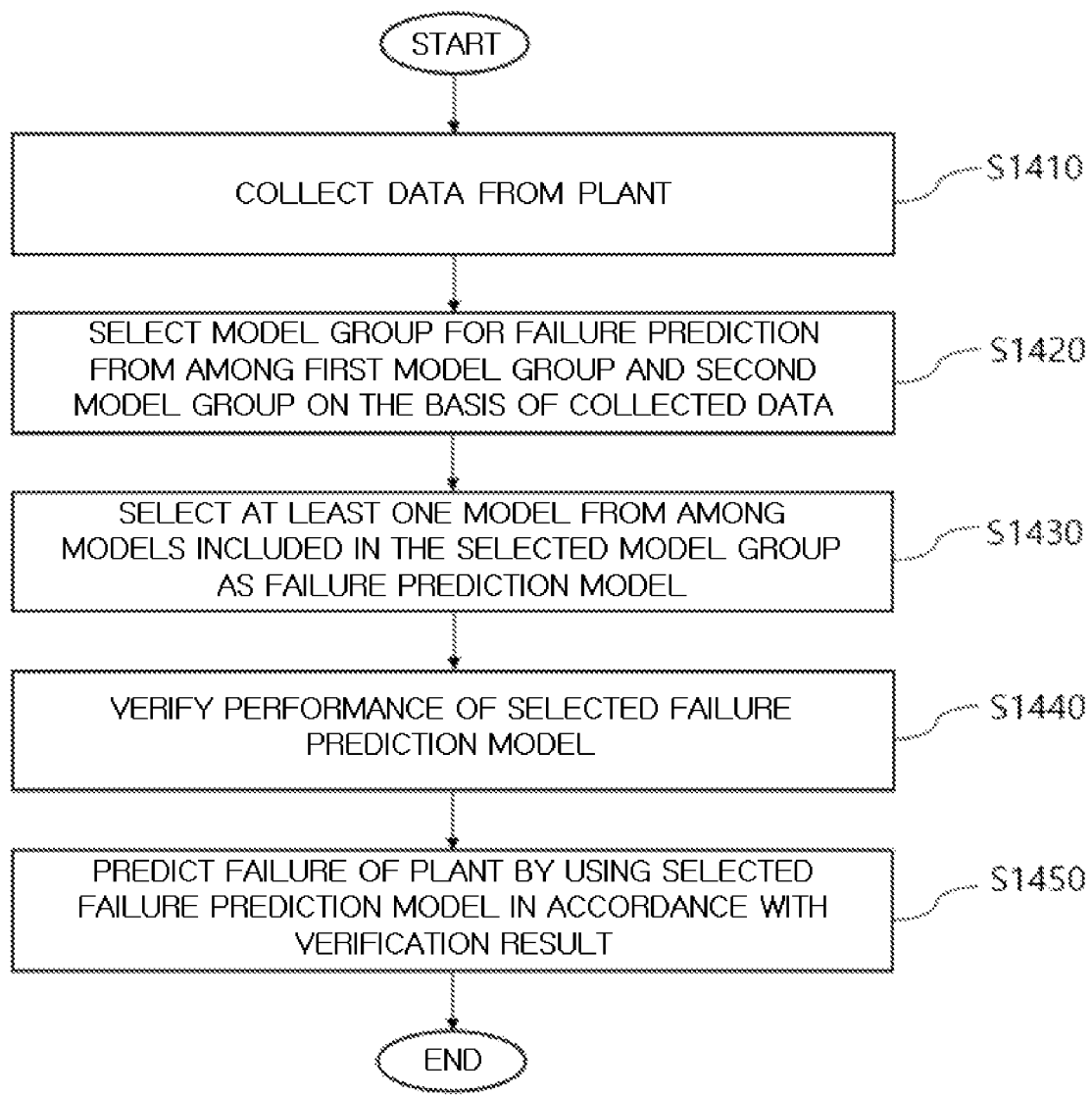
FIG. 14 is a view showing a failure prediction method according to a fourth exemplary embodiment.

FIG. 14 is a view showing a failure prediction method according to a fourth exemplary embodiment.

Referring to FIG. 14, the processor 220 may collect data from the plant 100 (operation S1410). The data collected from the plant 100 may include a temperature, pressure and humidity, NOx, SOx, O2, displacement, efficiency, and power generation output for specific components included in the plant 100. Also, the data collected from the plant 100 is related to the state of the plant 100, and may include data collected from the plant 100 at a previous time point and data collected from the plant 100 at a current time point.

The processor 220 may classify the data collected from the plant 100 into an input data and an output data. For example, the output data may be a final result and may be a parameter that can determine a failure of the specific component. The input data may be a parameter that affects the final result for a specific component.

The processor 220 may select a model group for failure prediction from among a first model group and a second model group based on the collected data (operation S1420). Here, the failure prediction model may include the first model group that is a physics-based model and the second model group that is a data-based model. The first model group is a group of first models based on laws of physics and may be a model that outputs a determined value for a specific value. The second model group is a group of second models based on data and may be a model that analyzes and outputs data stored for a specific value.

The processor 220 may select the second model group if the number of data collected from the plant 100 is equal to or greater than a pre-determined number, and may select the first model group if the number of data collected from the plant 100 is less than the pre-determined number.

The processor 220 may select at least one of the models included in the selected model group as the failure prediction model (operation S1430).

If the second model group is selected, the processor 220 may select at least one second model from among the second models included in the second model group in accordance with the number of data. For example, each of the second models included in the second model group may match the number of data. The processor 220 may select the second model corresponding to the number of data collected from the plant 100 as the failure prediction model. Also, the processor 220 may select the second model matching the number of data less than the number of the collected data as the failure prediction model.

If the first model group is selected, the processor 220 may select at least one first model from among the first models included in the first model group by using the data collected from the plant 100. The processor 220 may select at least one first model from among the first models included in the first model group by using the result of dividing the data collected from the plant 100 into the input data and the output data. The processor 220 may set the input data as input values of the first models, and compare the output values output from the first models by the input values with the output data.

As a result of comparing the output value output from the first models with the output data, the processor 220 may select a first model having the smallest residual between the output value and the output data as the failure prediction model.

The processor 220 may verify a performance of the selected failure prediction model (operation S1440). The processor 220 may verify the performance of the selected failure prediction model by using a previously collected and stored data set. Here, the data set may be data collected from the plant 100 in the past, and the input data and the output data may be matched and stored in the data set.

The processor 220 may input the input data of the data set to the selected failure prediction model, and compare the output value output from the selected failure prediction model and the output data matching the input data. As a result of comparing the output value output from the selected failure prediction model and the output data, if a residual between the output value and the output data is greater than or equal to a certain value, the processor 220 may verify that the performance of the selected failure prediction model is low, and if the residual between the output value and the output data is less than the certain value, the processor 220 may verify that the performance of the selected failure prediction model is high.

The processor 220 may predict the failure of the plant 100 based on the result of verifying the performance of the selected failure prediction model (operation S1450).

Here, if it is verified that the performance of the selected failure prediction model is not good, the processor 220 may not predict a failure of the plant 100 by using the selected failure prediction model. If the performance of the selected failure prediction model is not good, the processor 220 may reselect a failure prediction model by using the data collected from the plant 100.

If it is verified that the selected failure prediction model has a good performance, the processor 220 may predict the failure of the plant 100 by using the selected failure prediction model.

The failure prediction method shown in FIG. 13 and the failure prediction method shown in FIG. 14 may be used interchangeably. For example, operation S1320 of FIG. 13 and operations S1420 and S1430 of FIG. 14 may be applied interchangeably. Also, operations S1350 and S1360 of FIG. 13 may be applied interchangeably with operation S1450 of FIG. 14.

While not restricted thereto, an exemplary embodiment can be embodied as computer-readable codes on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an exemplary embodiment may be written as a computer program transmitted over a computer-readable transmission medium, such as a carrier wave, and received and implemented in general-use or special-purpose digital computers that execute the programs. Moreover, it is understood that in exemplary embodiments, one or more units of the above-described apparatuses and devices may include or be implemented by circuitry, a processor, a microprocessor, etc., and may execute a computer program stored in a computer-readable medium.

As described above, according to one or more exemplary embodiments, it is possible to implement the failure prediction model generating apparatus which selects the optimal failure prediction model from among the plurality of failure prediction models using the data collected from the plant and generates a new failure prediction model through the result of the prediction of the failure of the plant using the selected optimal failure prediction model, and to implement a method thereof.

While exemplary embodiments have been described with reference to the accompanying drawings, it is to be understood by those skilled in the art that various modifications in form and details may be made therein without departing from the sprit and scope as defined by the appended claims. Therefore, the description of the exemplary embodiments should be construed in a descriptive sense only and not to limit the scope of the claims, and many alternatives, modifications, and variations will be apparent to those skilled in the art.

What is claimed is:

1. A failure prediction method for a plant comprising:
    storing a plurality of failure prediction models derived previously in a memory;
    collecting data measured from the plant;
    selecting at least one failure prediction model from among the plurality of failure prediction models using the collected data; and
    predicting a failure of the plant using the selected failure prediction model,
    wherein the plurality of failure prediction models comprises a first model group including failure prediction models that are physics-based models and a second model group including failure prediction models that are data-based models,
    wherein the selecting at least one failure prediction model comprises:
        selecting a model group from among the first model group and the second model group based on the collected data; and
        selecting at least one failure prediction model from among the failure prediction models included in the selected model group.

2. The failure prediction method of claim 1,
    wherein the selecting the model group comprises:
        selecting the second model group if a number of the data collected from the plant is equal to or greater than a pre-determined number, and
        selecting the first model group if a number of the data collected from the plant is less than the pre-determined number.

3. The failure prediction method of claim 2,
    wherein each of the failure prediction models included in the second model group is stored in the memory with a corresponding number of data, and
    wherein, if the second model group is selected, the selecting at least one failure prediction model from among the failure prediction models included in the selected model group comprises selecting at least one failure prediction model, from among the failure prediction models included in the selected model group, whose corresponding number of data matches the number of the collected data.

4. The failure prediction method of claim 2,
    wherein each of the failure prediction models included in the second model group is stored with a corresponding number of data, and
    wherein, if the second model group is selected, the selecting at least one failure prediction model from among the failure prediction models included in the selected model group comprises selecting at least one failure prediction model, from among the failure prediction models included in the selected model group, whose corresponding number of data is less than or equal to the number of the collected data.

5. The failure prediction method of claim 1, wherein the collecting data comprises:
    classifying data that can determine a failure among the data collected from the plant as an output data and classifying data that affects the output data among the data collected from the plant as an input data; and
    matching the input data and the output data and storing them in the memory.

6. The failure prediction method of claim 5, wherein the selecting at least one failure prediction model comprises:
    inputting the input data to each of the plurality of failure prediction models and obtaining an output value output from each of the plurality of failure prediction models;
    obtaining a residual between the output value and the output data by comparing the obtained output value and the output data matching the input data for each of the plurality of failure prediction models; and
    selecting at least one failure prediction model having a smallest residual.

7. The failure prediction method of claim 1, further comprising:
    evaluating a performance of the selected failure prediction model using a result of the prediction of the failure of the plant;
    generating a new failure prediction model according to a result of evaluating the performance of the selected failure prediction model; and
    evaluating a performance of the new failure prediction model.

8. The failure prediction method of claim 7, wherein the evaluating the performance of the selected failure prediction model comprises:
    obtaining a predicted value predicting data to be measured from the plant at a specific time point in the future by using the selected failure prediction model;
    obtaining a measured value measured by the plant at the specific time point; and
    evaluating the performance of the selected failure prediction model by comparing the predicted value and the measured value.

9. The failure prediction method of claim 1, wherein the predicting the failure of the plant comprises predicting at least one of a prediction value and a trend for a specific time point, when and where a failure is expected to occur, an alarm level, and a cause of the failure.

10. A failure prediction apparatus for a plant comprising:
a memory configured to store a plurality of failure prediction models derived previously; and
a processor configured to predict a failure of the plant,
wherein the processor is configured to:
collect data measured from the plant,
select at least one failure prediction model from among the plurality of failure prediction models using the collected data, and
predict a failure of the plant using the selected failure prediction model,
wherein the plurality of failure prediction models comprises a first model group including failure prediction models that are physics-based models and a second model group including failure prediction models that are data-based models, and
wherein the processor is further configured to:
select a model group from among the first model group and the second model group based on the collected data; and
select at least one failure prediction model from among the failure prediction models included in the selected model group.

11. The failure prediction apparatus of claim 10, wherein the processor is further configured to:
select the second model group if a number of the data collected from the plant is equal to or greater than a pre-determined number, and
select the first model group if the number of the data collected from the plant is less than the pre-determined number.

12. The failure prediction apparatus of claim 11, wherein each of the failure prediction models included in the second model group is stored in the memory with a corresponding number of data, and
wherein, if the second model group is selected, the processor is further configured to select at least one failure prediction model, from among the failure prediction models included in the selected model group, whose corresponding number of data matches the number of the collected data.

13. The failure prediction apparatus of claim 11, wherein each of the failure prediction models included in the second model group is stored in the memory with a corresponding number of data, and
wherein, if the second model group is selected, the processor is further configured to select at least one failure prediction model, from among the failure prediction models included in the selected model group, whose corresponding number of data is less than or equal to the number of the collected data.

14. The failure prediction apparatus of claim 10, wherein the processor is further configured to:
classify data that can determine a failure among the data collected from the plant as an output data and classify data that affects the output data among the data collected from the plant as an input data, and
match the input data and the output data and store them in the memory.

15. The failure prediction apparatus of claim 14, wherein the processor is further configured to:
input the input data to each of the plurality of failure prediction models,
obtain an output value output from each of the plurality of failure prediction models,
obtain a residual between the output value and the output data by comparing the obtained output value and the output data matching the input data for each of the plurality of failure prediction models, and
select at least one failure prediction model having a smallest residual.

16. The failure prediction apparatus of claim 10, wherein the processor is further configured to:
evaluate a performance of the selected failure prediction model using a result of the prediction of the failure of the plant,
generate a new failure prediction model according to a result of evaluating the performance of the selected failure prediction model, and
evaluate a performance of the new failure prediction model.

17. The failure prediction apparatus of claim 16, wherein the processor is further configured to:
obtain a predicted value predicting data to be measured from the plant at a specific time point in the future by using the selected failure prediction model,
obtain a measured value measured by the plant at the specific time point, and
evaluate the performance of the selected failure prediction model by comparing the predicted value and the measured value.

18. The failure prediction apparatus of claim 10, wherein the processor is configured to predict at least one of a prediction value, a trend for a specific time point, when and where a failure is expected to occur, an alarm level, and a cause of the failure using the selected failure prediction model.

* * * * *